United States Patent
Garner

(10) Patent No.: US 11,678,596 B1
(45) Date of Patent: *Jun. 20, 2023

(54) HYDRAULICALLY ACTUATED LITTER LEVEL

(71) Applicant: Litter Level LLC, Muscadine, AL (US)

(72) Inventor: Clark Adam Garner, Muscadine, AL (US)

(73) Assignee: Litter Level LLC, Muscadine, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/301,634

(22) Filed: Apr. 9, 2021

Related U.S. Application Data

(63) Continuation of application No. 16/423,674, filed on May 28, 2019, now Pat. No. 10,999,965.

(60) Provisional application No. 62/715,082, filed on Aug. 6, 2018.

(51) Int. Cl.
 *A01B 63/114* (2006.01)
 *A01K 1/015* (2006.01)

(52) U.S. Cl.
 CPC .......... *A01B 63/114* (2013.01); *A01K 1/0152* (2013.01)

(58) Field of Classification Search
 CPC ....... A01B 63/114; A01B 63/22; A01B 63/24; A01K 1/015; A01K 1/0152
 See application file for complete search history.

(56) References Cited

U.S. PATENT DOCUMENTS

| | | | | |
|---|---|---|---|---|
| 4,329,081 A * | 5/1982 | Buvik | ...................... | E01C 19/15 404/110 |
| 4,389,800 A * | 6/1983 | Goby | ...................... | E02F 3/651 37/415 |
| 5,143,309 A * | 9/1992 | Endom | ................ | A01B 33/021 241/189.1 |
| 5,957,394 A * | 9/1999 | Becker | ................... | A01K 5/002 239/689 |
| 6,308,785 B1 * | 10/2001 | Rhoden | .................. | A01B 63/22 172/393 |
| 6,648,250 B2 * | 11/2003 | Garnett | ..................... | A01C 3/06 239/658 |
| 6,951,253 B1 * | 10/2005 | Linsmeier | ................ | A01K 1/01 56/367 |
| 7,401,657 B2 * | 7/2008 | Huber | .................. | A01K 1/0128 172/764 |
| 7,628,346 B1 * | 12/2009 | Darden | .................. | A01K 31/04 241/101.77 |
| 8,302,891 B2 * | 11/2012 | Koehn | .................... | A01K 31/04 241/101.763 |
| 8,561,324 B1 * | 10/2013 | Kersten | .................... | A01K 1/01 15/93.3 |

(Continued)

*Primary Examiner* — James Keenan
(74) *Attorney, Agent, or Firm* — Squire Patent Consulting & IP Law LLC; Brendan E. Squire

(57) ABSTRACT

A litter distribution apparatus provides for even distribution of a bedding material to an animal containment area for animal husbandry operations. The distribution apparatus has vertically adjustable skid legs that support the apparatus at a desired elevation as it is drawn across a ground surface of the containment area. A frame and litter containment skirt allow for the accumulation of the bedding material and even disposition along the ground surface based on the selected elevation of the skid legs. The skid legs may be vertically adjustable via an actuator.

18 Claims, 4 Drawing Sheets

(56) References Cited

U.S. PATENT DOCUMENTS

| | | | |
|---|---|---|---|
| 9,332,736 B2 * | 5/2016 | Underwood | A01K 1/015 |
| 2012/0211247 A1 * | 8/2012 | Lorenz | A01B 49/02 |
| | | | 172/191 |

* cited by examiner

HYDRAULICALLY ACTUATED LITTER LEVEL

CROSS-REFERENCE TO RELATED APPLICATION

This application is a continuation of U.S. patent application Ser. No. 16/423,674, issued as U.S. Pat. No. 10,999,965 on May 11, 2021, and claims the benefit of priority of U.S. provisional application No. 62/715,082, filed Aug. 6, 2018, the contents of which are herein incorporated by reference.

BACKGROUND OF THE INVENTION

The present invention relates to farm implements, and more particularly to implements for distributing bedding litter in an animal husbandry facility.

In animal husbandry operations, it is often desirable to have a layer of loose bedding material, or litter, that is distributed on the ground surface of a pen, or other containment area for animals, such as poultry or livestock. After a certain amount of time, it is desirable to change out the litter, and any excrement, spoiled food, and other materials that the bedding is intended to capture in order to provide a healthy environment for the animals.

In these environments the litter is to be distributed on top of hard packed surface, it is difficult to get the litter material distributed evenly the same depth throughout the containment area. Conventional litter spreaders have wheels that ride on the loose material, thereby compacting or leaving linear rows and gaps in the litter, which can reduce the effectiveness of the litter in absorbing and containing the materials. Moreover, because the height of the spreader above the surface is in part determined by the amount of material beneath the wheels, the litter may not be distributed in a level, even manner.

As can be seen, there is a need for an improved litter distribution apparatus that provides even distribution of litter over a surface at a user selectable depth.

SUMMARY OF THE INVENTION

In one aspect of the present invention an implement for distributing a livestock litter material over a ground surface is disclosed. The implement may include a hitch configured to attach the implement to a ground transport vehicle. A frame assembly is supported on the hitch. A litter containment skirt having at least one sidewall is attached to the frame assembly. The litter containment skirt has an opening at a front end of the at least one sidewall relative to a direction of travel across a ground surface. The sidewall is configured to contain a volume of the livestock litter material. A skid shoe is disposed at a lower end of a skid leg that is operable via an actuator to support the litter containment skirt at a desired elevation above the ground surface for dispersion of the litter material at a uniform level on the ground surface.

In some embodiments, a leveling edge is defined along a bottom surface of the litter containment skirt. The leveling edge may be angled forwardly relative a direction of travel and downwardly relative to the ground surface.

In other embodiments, a return plate is defined along an upper end of the litter containment skirt and oriented forwardly of an aft sidewall to contain and return litter to within the confines of the litter containment skirt.

In other embodiments, the frame assembly includes a stationary frame attached to the hitch and a movable frame that is pivotally carried by the stationary frame. A first end of the actuator is attached to the stationary frame and a second end of the actuator is attached to the movable frame. The actuator may be a hydraulic actuator.

In other aspects of the invention, an implement for distributing a livestock litter material includes a frame assembly. A litter containment skirt having at least one sidewall is attached to the frame assembly. The litter containment skirt has an opening at a front end of the at least one sidewall relative to a direction of travel across a ground surface. The sidewall is configured contain a volume of the livestock litter material. A skid shoe is disposed at a lower end of a skid leg attached to the frame assembly. An actuator is configured to selectively position the skid shoe relative to the litter containment skirt, wherein the skid shoe supports the litter containment skirt at a desired elevation above the ground surface for dispersion of the litter material at a uniform level on the ground surface.

In other embodiments, a hitch is attached to the frame assembly. The hitch configured to couple the implement to a ground transport vehicle.

In other embodiments, the frame assembly includes a stationary frame assembly and a movable frame assembly pivotally attached to the stationary frame. A first end of the actuator may be attached to the stationary frame and a second end of the actuator is attached to the movable frame assembly.

In some embodiments, the containment skirt is attached to the stationary frame and the skid leg is attached to the movable frame.

In yet other aspects of the invention, an implement for distributing a livestock litter material includes a litter containment skirt having at least one sidewall attached to a first frame assembly. The litter containment skirt has an opening at a front end of the at least one sidewall relative to a direction of travel across a ground surface. The sidewall is configured contain a volume of the livestock litter material. A skid shoe is disposed at a lower end of a skid leg attached to a second frame assembly. An actuator has a first end that is attached to the first frame and a second end that is attached to the second frame assembly. The actuator is operable to selectively position the skid shoe relative to a bottom edge of the litter containment skirt, such that the skid shoe supports the litter containment skirt at a desired elevation above the ground surface for dispersion of the litter material at a uniform level on the ground surface.

In some embodiments, a leveling edge is defined along a bottom surface of the litter containment skirt. The leveling edge may be angled forwardly relative a direction of travel and downwardly relative to the ground surface.

In other embodiments, a return plate is defined along an upper end of the litter containment skirt and oriented forwardly of an aft sidewall to contain and return litter to within the confines of the litter containment skirt.

In yet other embodiments, a hitch is attached to the first frame assembly, the hitch configured to couple the implement to a ground transport vehicle. The actuator may be a hydraulic actuator.

These and other features, aspects and advantages of the present invention will become better understood with reference to the following drawings, description and claims.

DETAILED DESCRIPTION OF THE INVENTION

Figure 1:
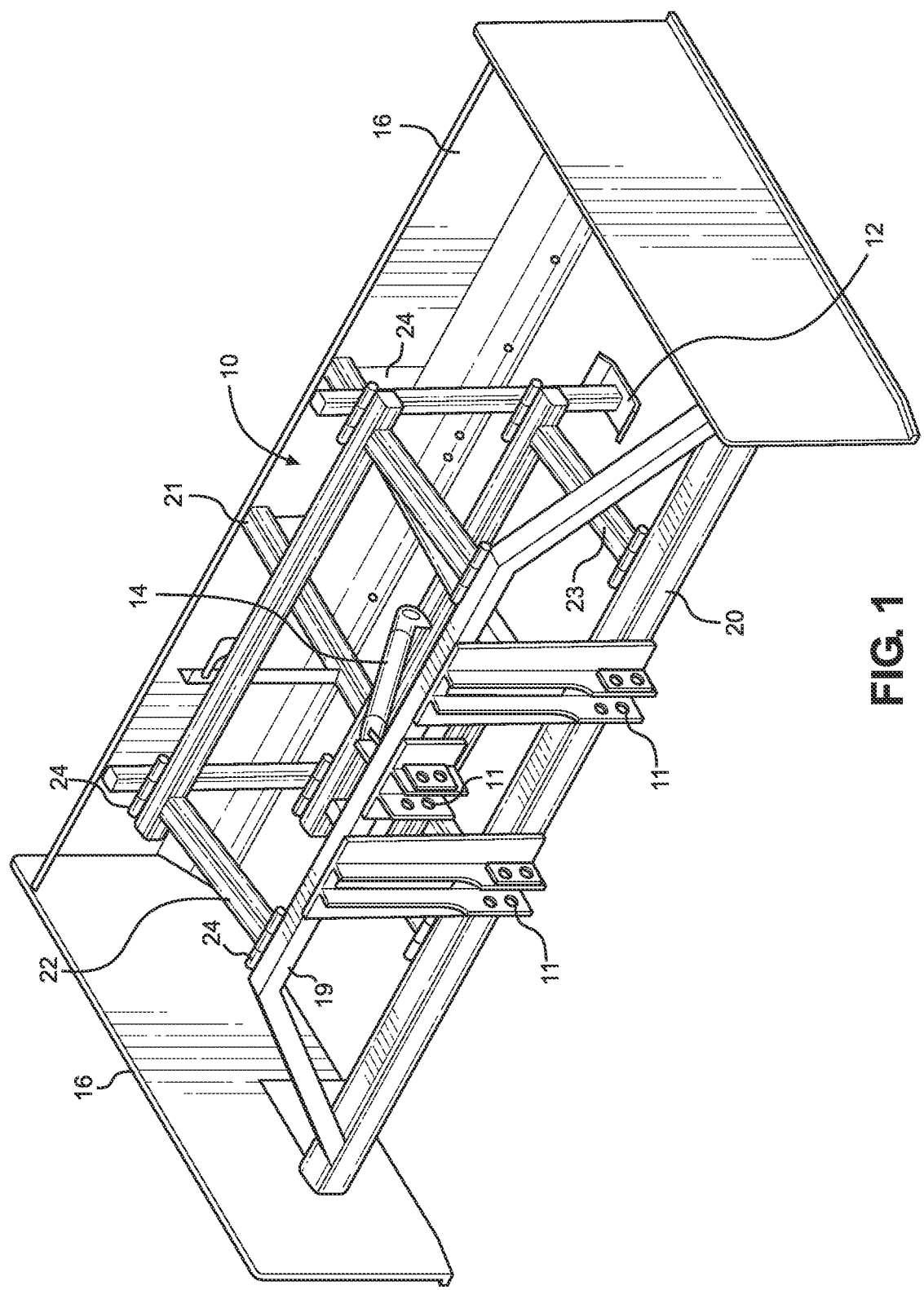
FIG. 1 is a perspective view of the hydraulically activated skid system.
Figure 2:
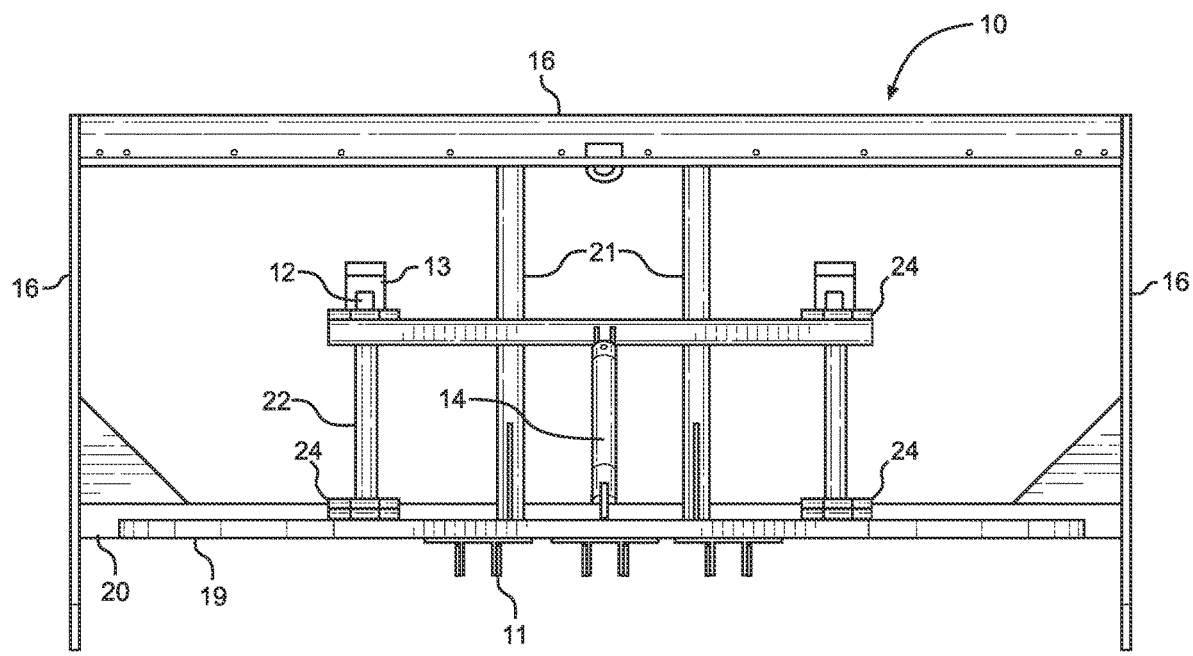
FIG. 2 is a top view of the hydraulically activated skid system.
Figure 3:
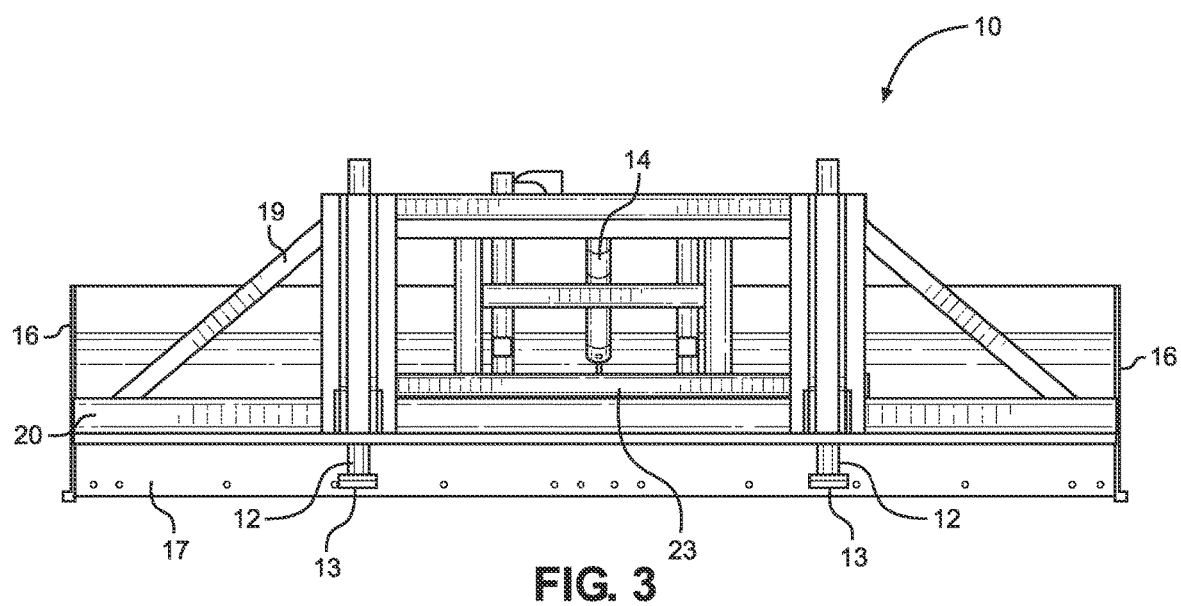
FIG. 3 is a front view of the hydraulically activated skid system.
Figure 4:
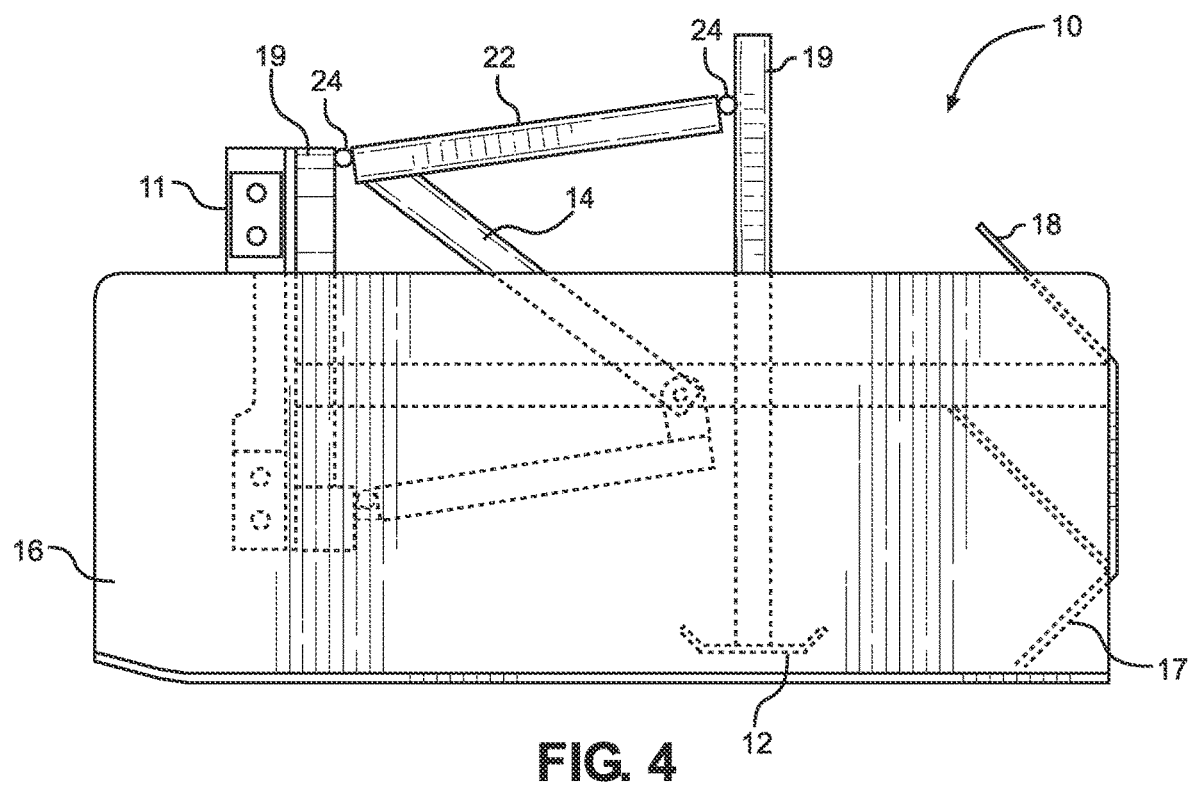
FIG. 4 is a side view of the hydraulically activated skid system.
Figure 5:
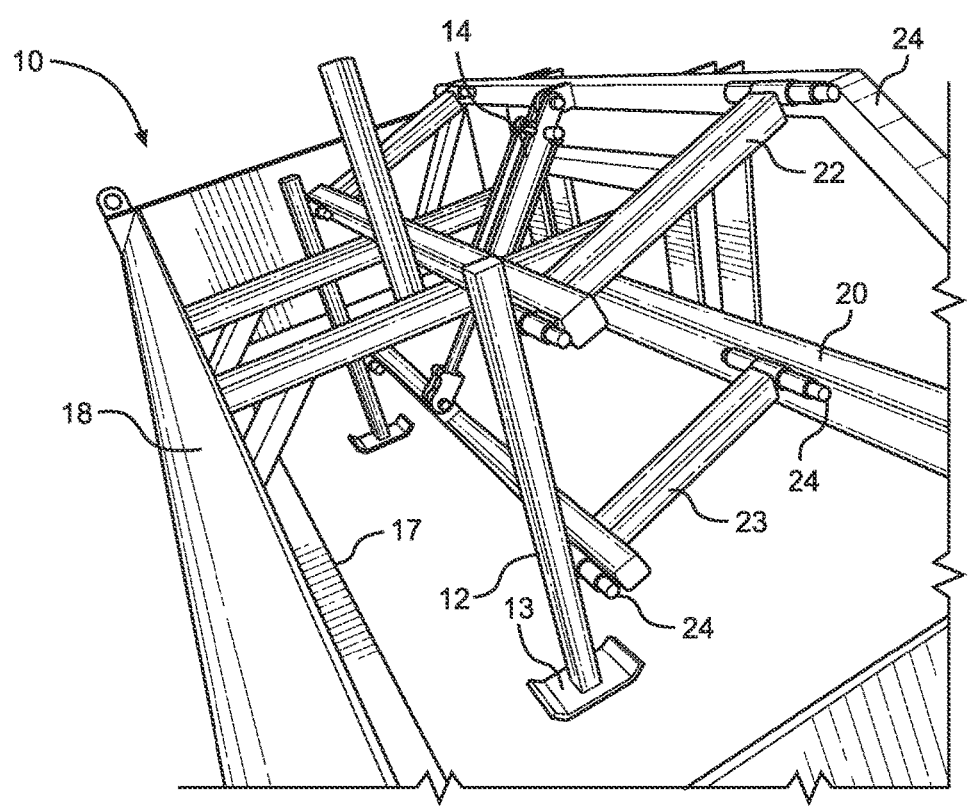
FIG. 5 is a close-up perspective view of the hydraulically activated skid system.
Figure 6:
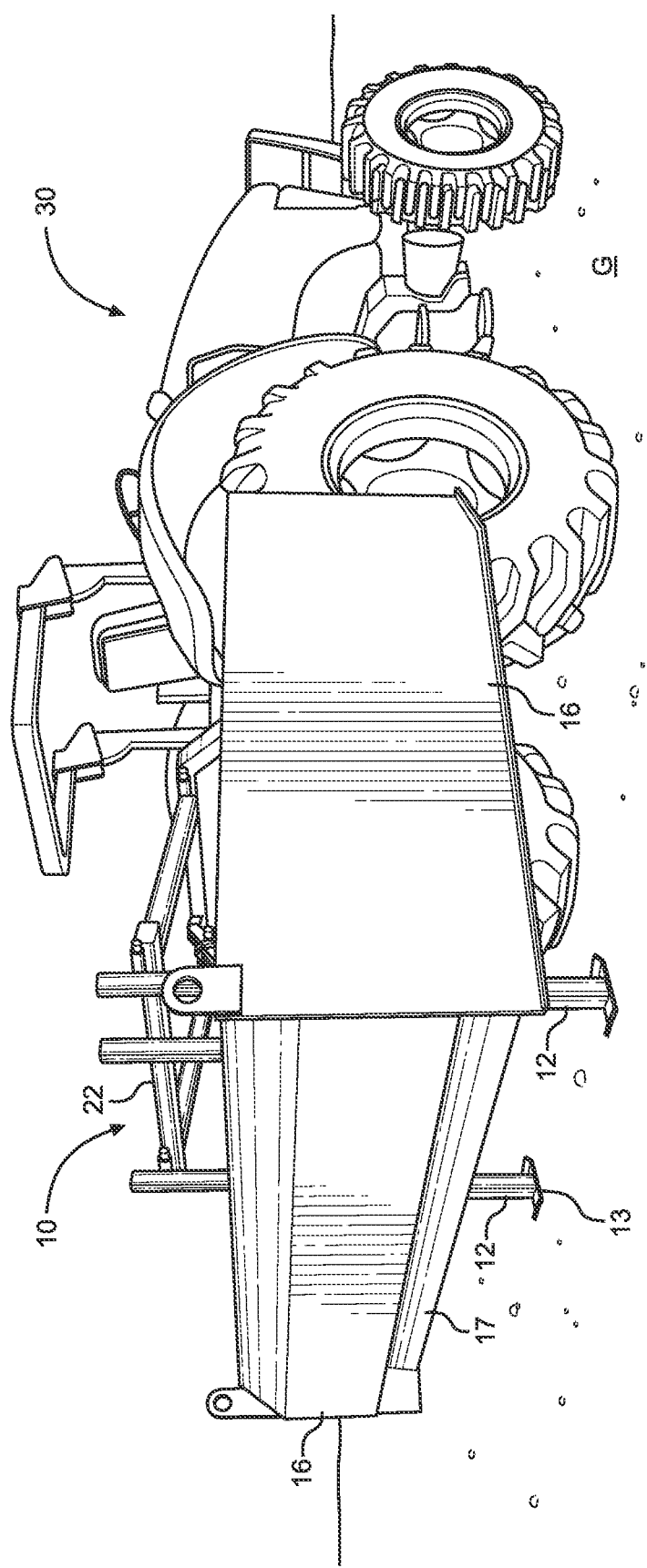
FIG. 6 is a view of the hydraulically activated skid system coupled to a tractor and in an elevated position.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provides an improved litter distribution apparatus that provides even distribution of litter over a surface of an animal containment area at a user selectable depth.

As seen in reference to the drawings the litter distribution apparatus 10 is configured with a mount 11, or hitch assembly, to attach to a motorized transport vehicle 30, such as a tractor, an all-terrain vehicle, or the like. The litter distribution apparatus 10 includes a frame assembly bounded by a litter containment skirt 16 having at least one sidewall. A leveling edge 17 is defined along a bottom surface of the skirt 16 and angled forwardly relative a direction of travel to enhance distribution of the litter. The litter containment skirt 16 is open at a front end relative to the direction of travel in which the litter distribution apparatus is drawn across the ground surface. A return plate 18 may be provided along an upper end of the skirt 16 and oriented forwardly to contain and return litter to within the confines of the skirt 16.

At least one skid leg 12 is carried by the frame assembly within the skirt 16. The skid leg 12 is adjustable relative to the containment skirt 16 to support the skid skirt 16 at a desired elevation above a ground surface. A skid shoe 13 is disposed at a bottom end of the skid leg 12 such that the skid shoe 13 is dimensioned to travel across a hard packed, or paved ground surface. Preferably, a plurality of skid legs 12 are provided to support the skirt 16 at a selected elevation across the ground surface so that litter contained within the containment skirt 16 is distributed across the ground surface beneath the leveling edge 17 of the skirt.

The frame assembly may include a stationary frame assembly and a movable frame assembly. In the non-limiting embodiment shown, the stationary frame assembly may include a laterally disposed upper frame member 19, a lower frame member 20, and a longitudinal frame member 21 to which the containment skirt 16 is attached to define a box around an outer periphery of the litter distribution apparatus 10. An upper 22 and a lower 23 skid strut are pivotally attached at a forward end thereof to a transverse member of the upper 19 and the lower 20 frame members via a hinge 24. The skid legs 12 may be pivotally attached to an aft end of each of the upper 22 and lower 23 skid struts via a hinge 24 so that the skid legs 12 are positioned in a substantially vertical orientation.

An actuator 14, such as a hydraulic actuator is operably connected between one of the skid struts 22, 23 and one of the stationary frame members 19, 20 so that the skid legs 12 may be operated to position the skid shoes 13 at a desired elevation below the leveling edge 17 of the containment skirt 16.

As will be appreciated with the benefit of the Applicant's disclosure, the containment skirt 16 may alternatively be carried on the movable frame assembly, while the skid legs 12 may be carried on the stationary frame assembly. In either event, the actuator 14 is operable to position the skid legs 12 relative to the containment skirt 16 such that the skid legs 12 support the containment skirt 16 at a desired level above the ground surface for an even distribution of the livestock litter.

In operation, as the litter distribution apparatus 10 is drawn across the ground surface, the open end of the apparatus 10 is drawn over a pile or heap of litter material that has been applied for distribution in the containment area. With the skid legs 12 set at a desired elevation, corresponding to a desired depth of the distributed litter, the skid shoes 13 support the distribution apparatus 10 as it is drawn across the ground surface G.

The heaped litter material is carried within the containment skirt 16 and is evenly distributed across the ground surface G as it drops below the distribution edge 17. With the skid legs 12 carried within the containment skirt 16 and the skid shoes 13 in contact with the ground surface G, accumulation of the litter material at an aft end of the containment skirt 16 ensures an even, level distribution of the litter material at the desired thickness, without compaction or undesirable gaps. The Applicant has found that skid shoes 13 are desirable over ground wheels for supporting the containment skirt 16 in that the skid shoes 13 have a greater tendency to maintain contact with the ground surface, and provide for more even distribution of the litter. Ground wheels, by contrast, have a tendency to ride up and on the litter material so that the depth of the litter material distributed may not be even.

Thus, the skid shoes 13 are attached to the implement 10 and are operable via the actuator 14 between a stationary frame assembly and a movable frame assembly to control the elevation of the skirt 16. Preferably, the skid legs 12 are adjusted using a hydraulic cylinder 14 that can lower or raise the skid shoes 13 which will in turn lift the skirt 16 of the implement 10 off the ground or hard surface to a desired height. The skirt 16 of the implement 10 can be held at this desired height while in use to control the height of implement 10 as well as the depth of litter materials dispersed over the ground surface.

It should be understood, of course, that the foregoing relates to exemplary embodiments of the invention and that modifications may be made without departing from the spirit and scope of the invention as set forth in the following claims.

What is claimed is:

1. An implement for distributing a livestock litter material on a ground surface, comprising:
    a hitch configured to attach the implement to a ground transport vehicle;
    a frame assembly having a stationary frame attached to the hitch and a movable frame pivotally carried by the stationary frame;
    a litter containment skirt having at least one sidewall attached to the frame assembly, the litter containment skirt having an opening at a front end of the at least one sidewall relative to a direction of travel across the ground surface with the litter containment skirt disposed in a trailing orientation from the frame assembly when carried by the ground transport vehicle, the at least one sidewall configured to contain a volume of the livestock litter material;

a skid shoe attached at a lower end of a skid leg supported in a vertical orientation, the skid shoe contained within an area surrounded by the litter containment skirt, and wherein the skid leg is adjustable relative to the litter containment skirt to selectively position a bottom edge of the litter containment skirt at a desired elevation above the ground surface with the skid shoe supporting the implement on the ground surface for dispersion of the livestock litter material at a uniform thickness across the ground surface corresponding to the desired elevation.

2. The implement of claim 1, further comprising:
a leveling edge defined along a bottom surface of the litter containment skirt.

3. The implement of claim 2, wherein the leveling edge is angled forwardly relative to a direction of travel when the implement is towed by the ground transport vehicle and projects downwardly to the ground surface.

4. The implement of claim 1, further comprising:
a return plate defined along an upper end of the litter containment skirt and oriented forwardly of an aft end of the at least one sidewall to contain and return litter to within confines of the litter containment skirt.

5. The implement of claim 1, further comprising:
an actuator operable between the stationary frame; and the movable frame.

6. The implement of claim 5, wherein a first end of the actuator is attached to the stationary frame and a second end of the actuator is attached to the movable frame.

7. The implement of claim 6, wherein the actuator is a hydraulic actuator.

8. An implement for distributing a livestock litter material, comprising:
a frame assembly;
a litter containment skirt coupled to the frame assembly, the litter containment skirt having a trailing sidewall and forwardly projecting lateral sidewalls, the litter containment skirt having an opening at a front end thereof, between the forwardly projecting lateral sidewalls, the litter containment skirt configured to contain a volume of the livestock litter material for a uniform dispersion of the livestock litter material across a ground surface;
a skid leg carried within the litter containment skirt and having a skid shoe disposed at a bottom end of the skid leg for supporting the implement when drawn across the ground surface, such that the uniform dispersion of the livestock litter material covers a track of the skid leg when the implement is drawn across the ground surface; and
the skid leg is adjustable relative to the litter containment skirt to selectively position a bottom edge of the litter containment skirt at a desired elevation for the uniform dispersion of the livestock litter material across the ground surface.

9. The implement of claim 8, further comprising:
a three-point hitch attached to the frame assembly, the three-point hitch configured to couple the implement to a ground transport vehicle.

10. The implement of claim 8, wherein the frame assembly further comprises:
a stationary frame assembly; and
a movable frame assembly pivotally attached to the stationary frame assembly.

11. The implement of claim 10, wherein a first end of an actuator is attached to the stationary frame assembly and a second end of the actuator is attached to the movable frame assembly.

12. The implement of claim 11, wherein the litter containment skirt is attached to the stationary frame assembly and the skid leg is attached to the movable frame assembly.

13. A method for distributing a livestock litter material at a uniform level across a ground surface, comprising:
drawing a livestock litter distribution implement across a ground surface, the livestock litter distribution implement having a litter containment skirt carried on a first frame assembly, the litter containment skirt configured to contain a volume of the livestock litter material, the litter containment skirt having a trailing edge supported at a desired elevation above the ground surface by a skid shoe disposed at a lower end of a skid leg attached to a second frame assembly, such that the skid shoe is contained within a boundary of the litter containment skirt;
adjusting the first frame assembly relative to the second frame assembly to vertically adjust the trailing edge at a desired elevation above the ground surface; and
containing the livestock litter material within the litter containment skirt via a return plate defined along an upper end of the litter containment skirt.

14. The method of claim 13, wherein:
the first frame assembly is adjusted relative to the second frame assembly via a hydraulic actuator operable between the first frame assembly and the second frame assembly to vertically adjust the trailing edge at the desired elevation above the ground surface.

15. The method of claim 13, further comprising:
providing a leveling edge along a bottom surface of the litter containment skirt.

16. The method of claim 15, further comprising:
angling the leveling edge forwardly relative to a direction of travel and downwardly relative to the ground surface.

17. The method of claim 13, further comprising:
attaching a hitch to the first frame assembly; and
coupling the livestock litter distribution implement to a ground transport vehicle.

18. The method of claim 17, wherein the hitch is a three-point hitch and the ground transport vehicle is a tractor, the method further comprising:
actuating a hydraulic actuator operatively connected to the three-point hitch of the tractor to selectively raise and lower the livestock litter distribution implement relative to the ground surface.

* * * * *